United States Patent

[11] 3,585,786

| [72] | Inventor | Leslie C. Hardison<br>Norwalk, Conn. |
|---|---|---|
| [21] | Appl. No. | 751,913 |
| [22] | Filed | Aug. 12, 1968 |
| [45] | Patented | June 22, 1971 |
| [73] | Assignee | Universal Oil Products Company<br>Des Plaines, Ill. |

[54] GAS-LIQUID SCRUBBING TOWER
4 Claims, 1 Drawing Fig.

[52] U.S. Cl. .................................................. 55/257,
55/241, 261/112
[51] Int. Cl. ........................................................ B01d 47/00
[50] Field of Search ............................................ 55/240,
241, 257; 261/112

[56] References Cited
UNITED STATES PATENTS

| 1,880,017 | 9/1932 | Harmon ........................ | 55/257 X |
| 2,139,827 | 12/1938 | Johnstone et al. ............ | 261/112 |
| 2,758,017 | 8/1956 | Allen et al. ................... | 261/112 X |
| 3,348,364 | 10/1967 | Henby ........................... | 55/257 |

*Primary Examiner*—Frank W. Lutter
*Assistant Examiner*—Steven H. Markowitz
*Attorneys*—James R. Hoatson, Jr. and Phillip T. Liggett ABSTRACT: A scrubbing tower for effecting a high degree of mass transfer without turbulence between a liquid and gas comprising a tower, divided into upper and lower sections by a partition, tubes extending through said partition, and appropriate liquid and gas inlets and outlets, whereby a liquid introduced into the upper section of the tower flows down the inside walls of the tubes in a laminar film, where it is contacted by a gas rising through the tubes.

From Replenishing Supply
Of Liquid

PATENTED JUN22 1971 3,585,786
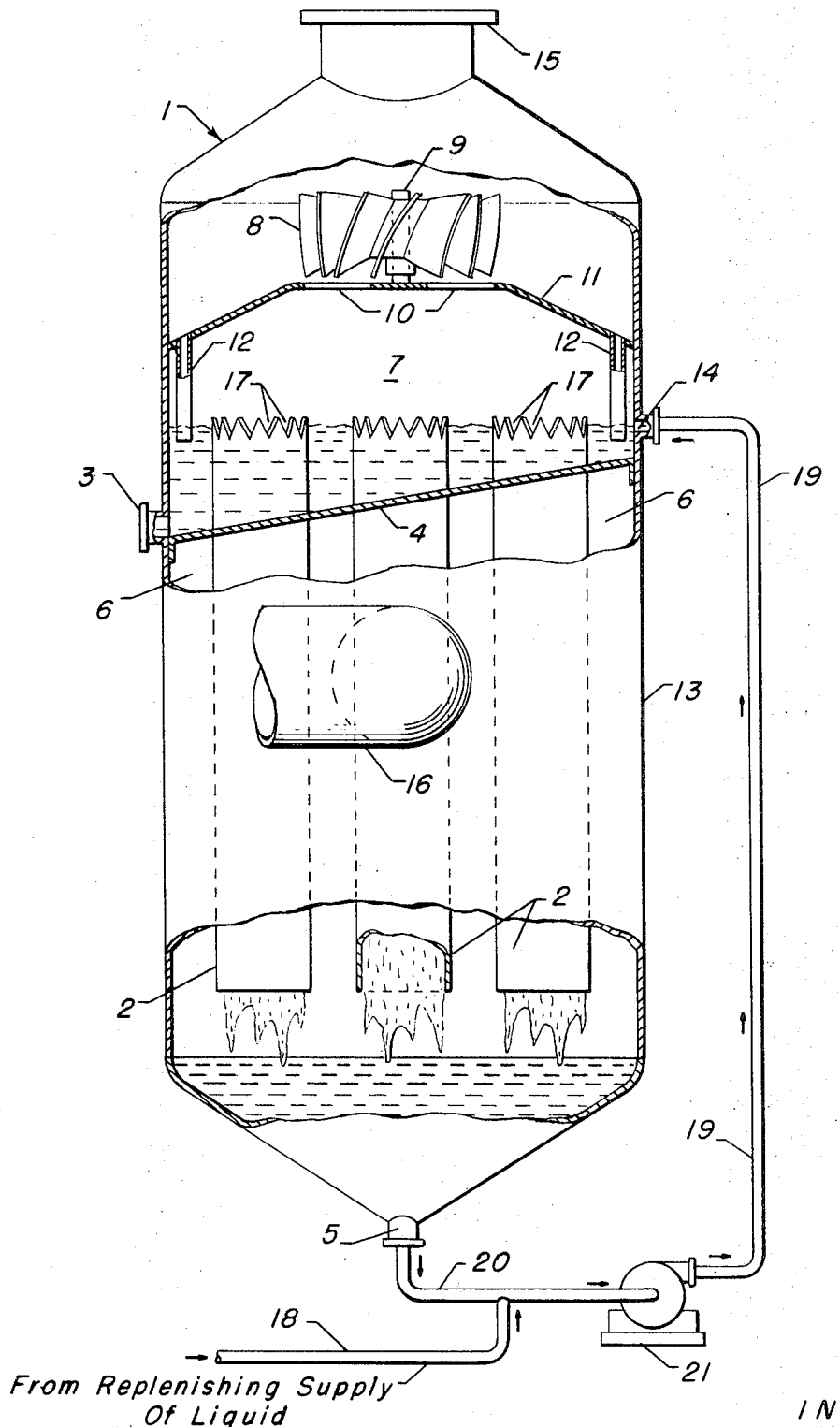
From Replenishing Supply
Of Liquid
INVENTOR:
Leslie C. Hardison
BY: James R. Hoatson, Jr.
Philip T. Liggett
ATTORNEYS

GAS-LIQUID SCRUBBING TOWER

The present invention relates to a scrubbing tower used to effect a high degree of mass transfer without turbulence between a liquid and a gas. More particularly, this scrubbing tower comprises a tower divided into upper and lower sections by a partition, tubes extending through said partition, a gas outlet and a liquid inlet in the upper section of said tower, and a gas inlet and a liquid outlet in the lower section of said tower, whereby a liquid introduced into the upper section of the tower flows down the inside walls of the tubes in a laminar film, where it is contacted by gas rising through the tubes.

There are currently several types of scrubbers used to effect mass transfer between a liquid and a gas, either for the purpose of purifying the gas, for effecting a chemical reaction between the liquid and the gas, or a combination of both. The simplest manner of contacting a liquid and a gas is by bubbling the gas through the liquid. This method has the advantage of requiring very little equipment, but has disadvantages in that the area of contact between liquid and gas is small, being only the surface area of the gas bubbles. This small area of contact results in only a small degree of mass transfer relative to the volumes of liquid and gas processed. This process also produces a sufficient degree of turbulence to cause frothing between certain liquids and gases. This frothing is undesirable in that it can cause clogging of the gas inlets, and occasionally the liquid inlets and gas outlets as well. Also, a minimum gas pressure must be maintained to overcome the liquid pressure at the gas inlet and thereby force the gas into the liquid.

Other systems currently in use operate by spraying a liquid downward into a rising gas stream. There are a great many variations of this type of system which, while effecting a great deal of gas-liquid contact, have the undesirable effect of further increasing the frothing of the liquid and the gas. Still another means currently employed in contacting gases and liquids is a device which blows upward a contacted mixture of a gas and liquid. Droplets of the liquid become entrained in the gas stream and are separated from the gas when the contacted mixture flows through a spinner. The spinner forces the liquid centrifugally outward, whereupon the liquid adheres to nearby static surfaces and eventually drains downward. This device, while again effecting a high degree of liquid-gas contact, is also vulnerable to the problem of frothing in that a froth, if produced, fouls the spinner blades, liquid drain, and gas outlet.

Heretofore, wetted wall columns, or tubes, have found little application to mass transfer problems, the only instance being as a condition accompanying heat exchange between a gas and a liquid. This is due to the low degree of mass transfer which has been characteristic of wetted wall tubes. In the present invention, however, a tube or a plurality of tubes are vertically mounted in a tower, the upper portion of these tubes being surrounded by a liquid. The liquid flows as a laminar film down the inner walls of the tubes while the gas to be contacted rises in the center of the tube or tubes and contacts the laminar film of down flowing liquid, thereby effecting mass transfer between the liquid and the gas. In this arrangement there is no turbulence created, and consequently no froth, with its attendant problems, is produced.

The principal object of the present invention is to provide a means to effect mass transfer between a liquid and a gas, with a minimum of turbulence. The mass transfer may be for the purpose of cleansing the gas of entrained solids, reacting the gas with the liquid, or absorbing the gas in the liquid.

Another object of this invention is to prevent the formation of froth by eliminating turbulence when contacting the gas and the liquid. Frothing is particularly predominant where the purpose of contacting the gas and liquid is to effect a chemical reaction. This invention, because of its desirable features, has particular application in oxidizing waste sulfide liquor in the production of paper, disentraining fly ash from a flue gas stream, producing nitric, sulfuric, and hydrochloric acid, and extracting oxides of nitrogen from the tail gas resulting from nitric acid production. In addition, the invention lends itself to a variety of other applications where mass transfer between a liquid and gas is desired.

In a broad aspect, this invention is an apparatus for effecting mass transfer between a liquid and a gas comprising a tower separated into upper and lower sections by a transverse partition, tubes enclosed within said tower and vertically extending through said partition with their upper ends terminating in the upper section of said tower and with their lower ends terminating in the lower section of said tower, a liquid inlet in said upper section of said tower, a liquid outlet from said lower section, a gas inlet in said lower section, and a gas outlet in said upper section, whereby a liquid introduced into said upper section descends as a laminar film down the inside walls to said tubes, where it is contacted by a gas introduced into said lower section and ascending into said upper section through said tubes.

As mentioned, one of the predominant characteristics of this invention is the high degree of mass transfer effected using wetted wall columns. This is due to the positioning of the tubes within the tower. The tubes which extend between the upper and lower portions of the tower, must be vertical within a very small tolerance. This vertical positioning insures that a liquid flowing over the top and down the walls of the insides of a tube will, from the top of the tube to the bottom, flow in a substantially uniform laminar film around the circumference of the inside surface of the tube. Any substantial deviation of a tube from a vertical position will cause the downward flowing liquid to gravitate in the direction of tipping, thereby flowing down the tube in a channel rather than in a laminar film. The significance of this different flow configuration is that there is much greater surface area of contact between the ascending gas and descending liquid when the liquid flows in a laminar film. Since the degree of mass transfer is directly dependent on the area of contact between the liquid and gas, maintaining laminar layers of liquid in the tubes significantly increases the extent of mass transfer. The magnitude of the difference involved is appreciable since the area of contact of a gas with a laminar film of liquid is over three times as great as the area of contact of a gas with a channel to liquid in a hollow tube where the cross section of liquid flowing covers about 19 percent of the cross-sectional area of the passageway formed by the tube. The smaller the volume flow rate, the greater is the surface contact advantage of a laminar film over a channel.

In the preferred embodiment of this invention the thickness of the laminar layer of film in the tubes is maintained at an absolute minimum when the upper ends of the vertical tubes terminate in a plurality of V-shaped notches around the perimeters of the tube walls. These V-shaped notches extend entirely through the tube walls. Construction of the tubes in this manner eliminates almost entirely the influence of surface tension, which tends to increase the thickness of a film of liquid which flows down into a vertical tube by flowing over an end which is cut horizontally. When a tube with a horizontally terminated upper is used, a liquid level will rise above the level of the end the tube without flowing down into the tube. When the level is increased still further; to the point where the surface tension within the liquid no longer prevents the liquid from flowing into the tube, the liquid flows into the tube in a substantial thickness. While such flow does take the form of a laminar farm film, it is a film of substantial thickness. On the other hand, when the top of each tube is terminated in a series of V-shaped notches, as in the preferred embodiment of the present invention, the water rises slightly above the apex of the notches before surface tension is overcome and the liquid flows through the lower portion of the notches and into the tube. In passing through the notches in the tube walls, the thickness of the liquid flow is substantially the same as in flowing over the top of a tube, as heretofore described. Upon reaching the inside surface of the tube wall, however, the flowing liquid expands laterally to uniformly cover the surface adjacent to the V-shaped notches. This lateral expansion decreases the depth or thickness of the liquid as the liquid flows down the tube walls. Since the rate of mass transfer between the descending liquid and the rising gas is dependent only on the surface area of contact between the liquid and gas, a decrease in liquid film thickness decreases the liquid flow which must be maintained, while increasing slightly the surface area of contact. In a hollow cylindrical tube, this slight increase in surface contact area results from the increased diameter of the contact surface due to the decreased thickness of the liquid film.

In the application of this invention there is a certain amount of evaporation and entrainment of droplets of the downward flowing liquid into the gas ascending through the tubes. For this reason, in the preferred embodiments of this invention, a spinner is vertically mounted above the upper ends of the vertical tubes and below the gas outlet in the upper section of the tower. This spinner may be of a type which rotates about an axis, whereby the rising gas turns the spinner, thereby forcing entrained droplets of liquid against the walls of the tower, whereupon deentrainment of these droplets is effected. The use of such a spinner also results in a certain amount of condensation of evaporated liquid onto the spinner blades. This condensed liquid is likewise forced to the inside walls of the tower, along with the liquid entrained in the gas. In a modification of the invention, the spinner may be a static spinner with blades curved concavely downwards. In this arrangement, the gas rises in a spiralling motion, thereby similarly forcing entrained particles of liquid against the tower walls. In either case, recovery of the liquid is effected and the gas is partially dried before leaving the tower. To increase the extent of deentrainment of the liquid, a collar having a raised central portion may be positioned around the spinner support, extending from the spinner to the inner walls of the tower and as clearly shown in the drawings of the invention. This collar provides an additional surface upon which evaporated liquid condenses, as well as channeling all the ascending gas through the spinner, thereby increasing the effectiveness of the spinner. In this case, downcomers must be provided to allow deentrained and condensed liquid to drain from the portion of the tower above the spinner, either to the outside of the tower, or to the portion of the upper section of the tower below the spinner.

In the operation of this invention the liquid which descends from the lower end of the vertical tubes may either be drained and disposed of, or put to subsequent use, such as being recycled to the tower. It is important that the lower ends of the vertical tubes are positioned high enough so as not to be blocked by the liquid accumulating at the bottom of the lower section. If this occurs, the gas will be unable to enter the vertical tubes.

Where it is desired to recycle the liquid, there is a liquid drain provided leading from the lowest portion of the upper section to outside the tower. This provides a means for the final withdrawal of a portion of the liquid In addition, the liquid outlet from the lower tower section is connected by a first pipe to a pump. At or before the pump, a pipe leading from a replenishing supply of liquid is also connected to the first pipe or to the pump, and the pump is in turn connected by a third pipe to the liquid inlet in the upper section, whereby liquid flowing down the walls of the tubes and through the liquid outlet in the lower section is recycled back to the upper section of the tower. Using this apparatus, the liquid which flows from the tube is pumped, along with a replenishing portion of liquid from an outside source, to the upper tower section for recycling purposes. A portion of the liquid is withdrawn from this upper tower section at a rate fixed according to the extent to which it is desired to limit the reaction or absorption of the gas with the liquid. The replenishing supply provides additional liquid to compensate for the liquid withdrawn from the upper tower section and that portion of liquid entrained in or evaporated into the gas which escapes through the gas outlet in the upper tower section.

This invention is further illustrated in the attached drawing in which a portion of a preferred embodiment of the invention is cut away from an elevational view.

Referring now to the drawing, tower 1 is divided by partition 4 into an upper section 7 and a lower section 6. Tubes 2 extend through partition 4 with their upper ends being in upper section 7 and their lower ends being in lower section 6. The upper ends of tubes 2 terminate in a plurality of V-shaped notches 17, which extend through the walls and around the upper perimeter of the tubes 2. There is a liquid inlet 14 and a gas outlet 15 in upper section 7, and there is a gas inlet 16 and a liquid outlet 5 in lower section 6. Gas inlet 16 is located well above the liquid level in lower section 6 so that the liquid does not back up into gas inlet 16. A spinner 8 is located above the upper ends of tubes 2. Spinner 8 is mounted on axis 9, which is supported by spokes 10, which are, in turn, supported from the walls 13 of tower 1 by collar 11. The spinner is centrally located in the raised center portion of such collar 11, and as also shown in the drawing of the invention. Downcomers 12 lead from that portion of upper section 7 above collar 11 to that portion of upper section 7 below collar 11. Such downcomers also extend below the liquid level in the upper section or just below the notches 17, and as further depicted in the drawing. Liquid outlet 5 leads to pipe 20, which leads to pump 21 and which is joined by pipe 18 prior to reaching pump 21. Pump 21 is connected to liquid inlet 14 by pipe 19. Pipe 18 is connected to a replenishing supply of liquid. Drain 3 extends from the lowest portion of upper section 7 to the outside of tower 1. In the operation of this invention, a forced air stream enters lower section 6 of tower 1 through gas inlet 16. At the same time, "black liquor" from cooling paper pulp, is continuously supplied to upper section 7 of tower 1 through liquid inlet 14. The "black liquor" contains substantial amounts of sodium hydroxide sodium sulfide, and sodium carbonate which, in a large part, are suspended as solids in the "black liquor." The continuous supply of "black liqupr" insures a continuous flow of "black liquor" into the V-shaped notches 17 of tubes 2, and then down the inside walls of tubes 2 as a laminar film. The "black liquor" then falls as sheets of liquid to the bottom of lower section 6. While the "black liquor" travels down the walls of tubes 2 as a laminar film, the air introduced through gas inlet 16 rises up the center of tubes 2. The oxygen in the air stream oxidizes both the dissolved and solid sodium sulfide to form sodium thiosulfate at the contact surface between the air stream and the "black liquor" in tubes 2. The sodium thiosulfate flows with the "black liquor" to the bottom of lower section 6. The flowing sheets of "black liquor," with entrained solids, create practically no froth in lower section 6, and thus the disadvantages of frothing are avoided. The "black liquor" and entrained solids flow from the bottom of lower section 6 through liquid outlet 5 to pump 21 by means of pipe 20. Before reaching pump 21, pipe 18 joins pipe 20, and either periodically or continuously supplies additional "black liquor" "containing sodium sulfide, to the system. "Black liquor" is withdrawn either periodically or continuously from upper section 7 by liquid 3 and the replenishing "black liquor" is introduced into the system through pipe 18 at the same time as a portion of the "black liquor" is being withdrawn through liquid drain 3. In this way, a consistent volume of flow through tubes 2 is maintained. The processed "black liquor" along with any replenishing "black liquor," is cycled by pump 21 back through pipe 19, through liquid inlet 14, into the lower portion of upper section 7.

The rising air which absorbs some of the liquid upon passing through the tubes 2 passes into upper sections 7 where it is channeled by collar 11 through spinner 8. The air current passes between the spokes 10 and strikes the blades of spinner 8. With the blade configuration as illustrated, spinner 8 rotates about axis 9 clockwise (as viewed from above) and thereby forces entrained and condensed droplets of liquid to the inside walls 13 of tower 1. This liquid eventually drains through downcomers 12 back into the main body of "black liquor" in the lower part of upper section 7. The partially dried air passes overhead and is exhausted through gas outlet 15.

In all cases, the drawing as illustrated shall not be considered as limiting the types or designs of towers, pumps, pipes, tubes, inlets, outlets, partitions, spinner systems, collars, downcomers, or drains used. Neither shall the application of this invention be limited to the process or materials described in connection with the drawing, as there are numerous applications of this invention.

I claim:

1. An apparatus for effecting mass transfer between a liquid and a gas comprising a tower separated into upper and lower sections by a transverse partition, tubes enclosed within said tower and vertically extending through said partition with their upper ends terminating in the upper section of said tower and with their lower ends terminating in the lower section of said tower, a liquid inlet in said upper section of said tower, a liquid outlet from said lower section, a gas inlet in said lower section, and a gas outlet in said upper section, said upper ends of said tubes terminating in a plurality of V-shaped notches whereby a liquid introduced into said upper section descends as a thin laminar film down the inside walls of said tubes where it is contacted by a gas introduced into said upper section through said tubes, a collar having a central raised portion mounted across said upper section of said tower above said tube ends, and below said gas outlet, and at least one liquid downcomer disposed in said collar near the wall of said tower wall, said downcomer having a lower exit extending below said V-shaped notches but exterior thereto, a spinner mounted upon said collar at said raised portion thereof, said spinner being responsive to the force of rising gas exiting from said tubes to thereby direct entrained droplets of liquid against the walls of said tower whereby deentrainment of s said droplets is effected for discharge through said downcomer.

2. The apparatus of claim 1 further characterized in that spinner is rotatably mounted for rotation thereof by the force of said rising gas.

3. The apparatus of claim 1 further characterized in that a static spinner with blades curved concavely downwards is vertically mounted above the upper end of said tubes and below said gas outlet in the upper section of said tower, whereby the gas rises in a spiralling motion forcing entrained droplets of the liquid against the walls of the tower whereupon deentrainment of these droplets is effected.

4. The apparatus of claim 1 further characterized in that there is a liquid drain leading from the lowest portion of said upper section to outside said tower, and the liquid outlet from said lower section is connected by a first pipe to a pump, a second pipe leading from a replenishing supply of liquid is also connected to the pump, and the pump is in turn connected by a third pipe to said liquid inlet in said upper section, whereby liquid flowing down the walls of said tubes and through the liquid outlet in said lower section is recycled back to the upper section of said tower.